UNITED STATES PATENT OFFICE.

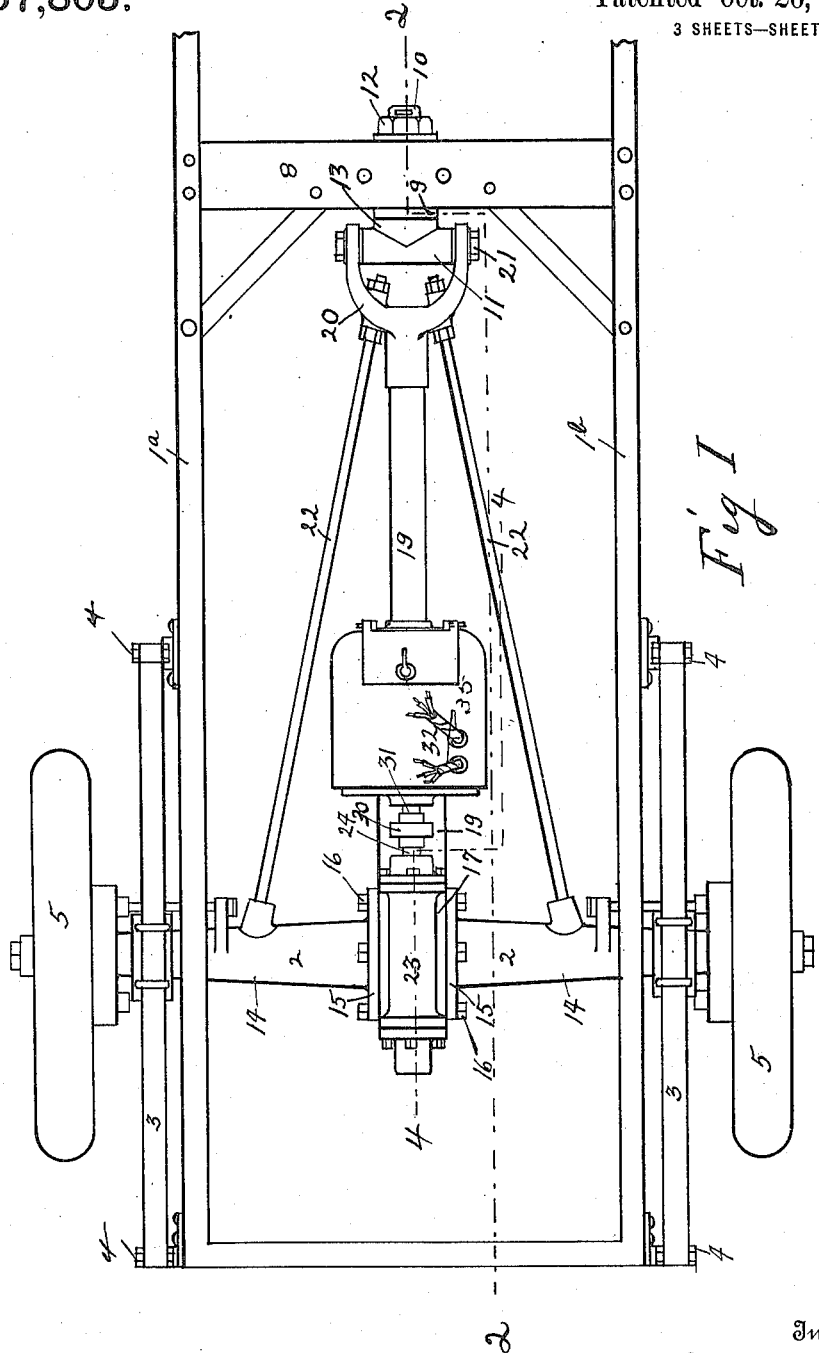

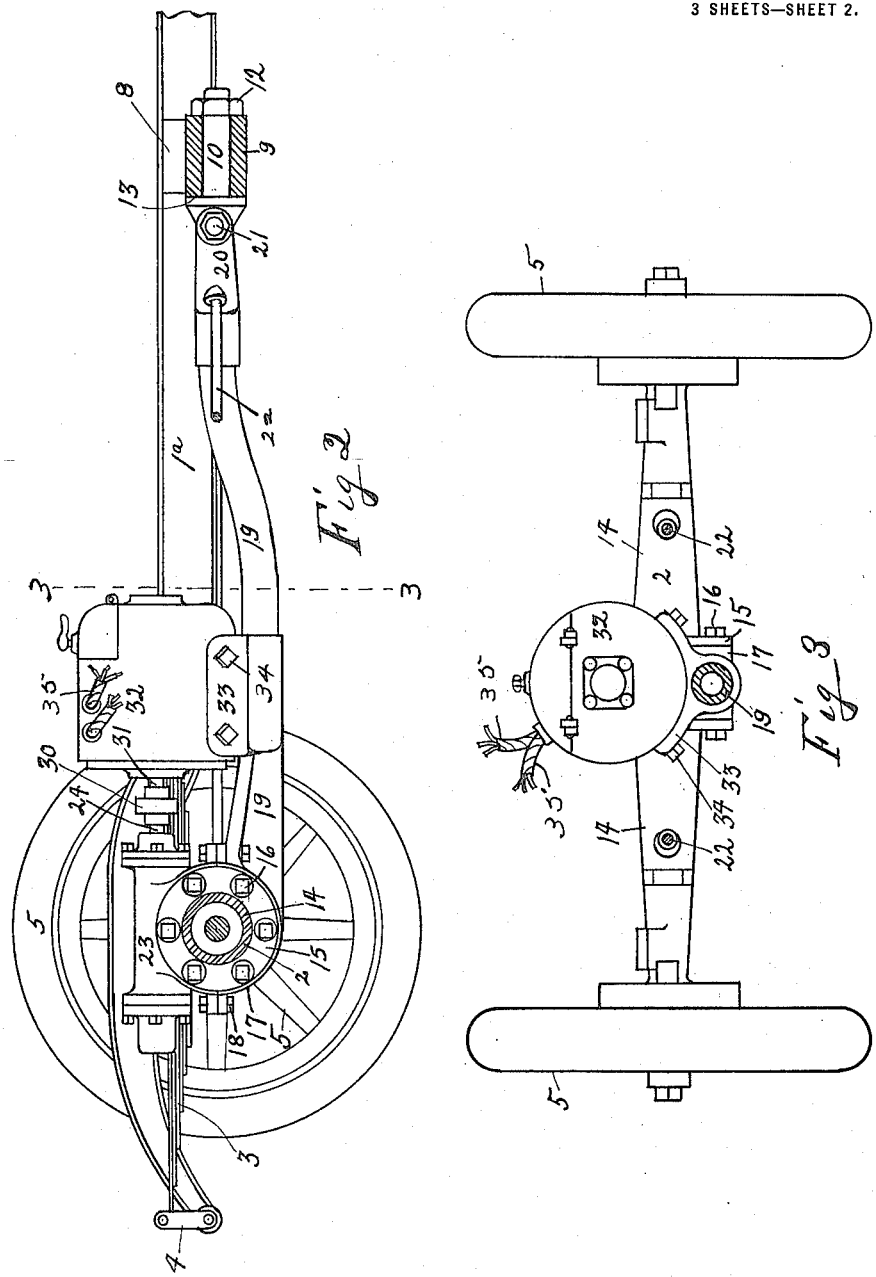

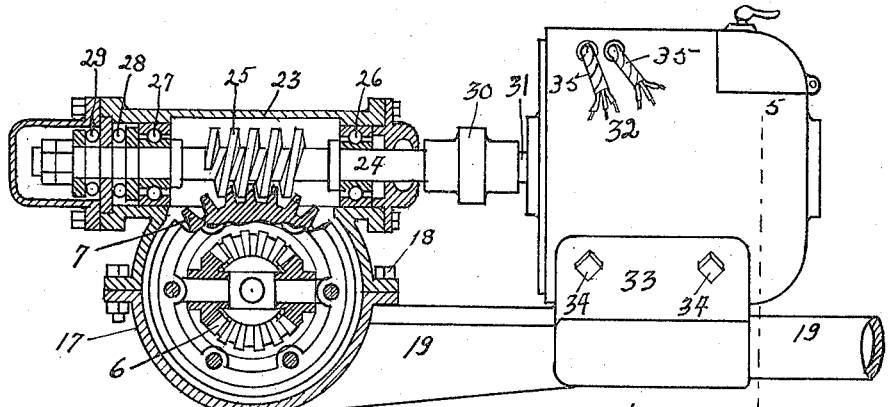
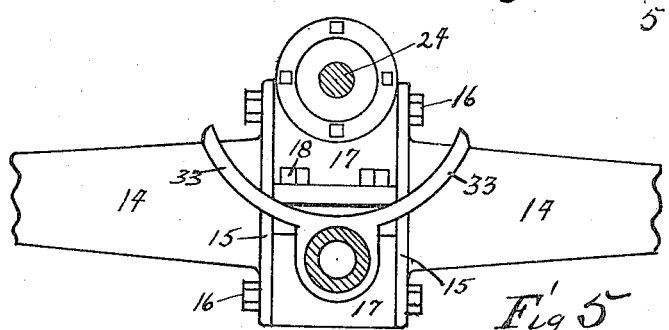
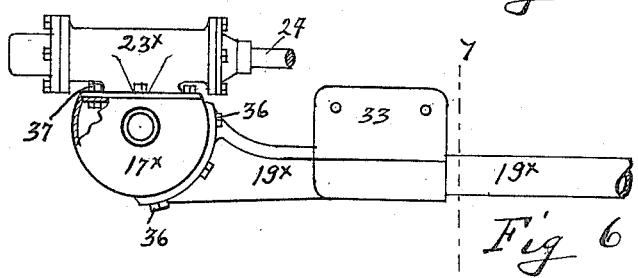
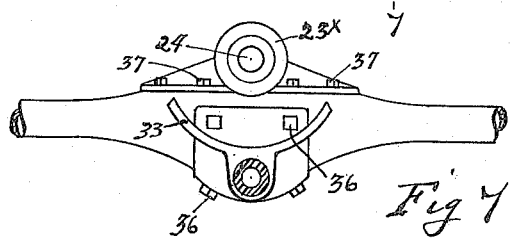

LEROY S. PFOUTS, OF CANTON, OHIO.

MOTOR-VEHICLE.

1,157,803.  Specification of Letters Patent.  Patented Oct. 26, 1915.

Application filed May 13, 1912. Serial No. 696,962.

*To all whom it may concern:*

Be it known that I, LEROY S. PFOUTS, a citizen of the United States, residing at Canton, in the county of Stark and State of Ohio, have invented a new and useful Motor-Vehicle, of which the following is a specification.

My invention relates to improvements in motor vehicles, and while applicable to various kinds of such vehicles, is more especially adapted to electric vehicles.

The objects of the invention are, to generally improve motor vehicles and to provide a simple, cheaply made, durable, efficient and accessible construction adapted to operate quietly and smoothly, to allow freedom of movement of the rear axle without strain upon the motor or its connections and to so mount the motor that it will be held firmly in place at all times, all moving parts thus maintaining true alinement and the motor being so mounted that its torque will have no injurious or undesirable effect upon its mounting or the parts connected thereto.

Further objects are to provide an improved means for communicating the driving thrust from the rear wheels and axle to the frame of the vehicle and to maintain the rear axle in proper transverse alinement while permitting freedom of movement in following the unevenness of the road at all times.

These objects, together with other objects readily apparent to those skilled in the art, may be attained by the construction illustrated in the accompanying drawings, although the invention may be embodied in other forms, the construction illustrated being chosen by way of example.

In the drawings Figure 1 is a top view of a portion of a chassis embodying my invention, said view including the rear axle, combined thrust and torque rod, and a portion of the main frame. Fig. 2 is a side view of the same partly in elevation and partly in vertical longitudinal section on the line 2—2 of Fig. 1. Fig. 3 is a vertical transverse sectional view on the line 3—3 of Fig. 2. Fig. 4 is an enlarged fragmentary view, partly in vertical longitudinal section on the line 4—4 of Fig. 1. Fig. 5 is a vertical transverse sectional view taken on the line 5—5 of Fig. 4, the motor being omitted. Fig. 6 is a view similar to Fig. 4, showing a modified construction and the motor omitted. Fig. 7 is a vertical transverse sectional view taken on the line 7—7 of Fig. 6.

Throughout the several views similar reference numerals indicate similar parts.

More specifically describing the construction disclosed in said drawings, the numerals $1^a$ and $1^b$ indicate the two side pieces respectively of the main frame of the chassis upon which the body of the vehicle is intended to rest. Said side pieces preferably do not extend horizontally in the same plane for their entire length, but have their rear ends upwardly arched or offset, where they extend over the rear axle housing 2, as shown in Fig. 2. The rear axle housing 2 is connected to the main frame by means of the rear springs 3, which are connected to said frame by means of the well known hanging links 4 to permit some longitudinal movement as between the main frame and said housing. The driving wheels 5 are mounted at the outer ends of the housing 2 upon a live axle, in any well known mechanical manner and the live axle is connected through the differential gear 6 to the worm wheel 7.

Forward of the housing 2 the main cross piece 8 of the main frame extends from the side piece $1^a$ to the side piece $1^b$, to which side pieces it is firmly connected. Intermediate the said side pieces, said cross piece is provided with a bearing 9 having its axis longitudinally, horizontally disposed, and rotatably arranged in said bearing is a spindle 10 provided with the integral, transversely arranged T head 11 at its rear end, and with means, such as the nut 12, coöperating with the shoulder 13, formed integrally with the spindle 10, for preventing longitudinal movement of said spindle within said bearing, while permitting its rotation.

The rear axle housing 2 comprises two transversely arranged tubular members 14 provided with integral, outwardly extending annular flanges 15 at their inner ends, said flanges 15 being connected by means of the machine screws 16 to the differential gear case 17. Said gear case comprises a lower member and an upper member connected to each other by the bolts 18. Formed integrally with the lower member of said gear case is the combined thrust and torque rod 19, said rod extending forwardly and being fixedly connected to the rear end of the connecting yoke 20, the two arms of which are pivotally connected by means of the bolt 21 to the head 11. It will be understood from the description, and an inspection of Fig. 1 that the rod 19 is connected to the cross piece 8 by a universal joint formed of the head 11 and the yoke 20 so that the rear end of the rod 19, following the vertical movements of the rear axle, as the wheels 5 ride over uneven surfaces, may be free to rise and fall, while the main frame is also free to move or rock laterally without twisting or straining the rod 19.

Fixedly connected to the tubular members 14 of the rear axle housing at points spaced from the inner ends of said members are the brace rods 22 which extend forwardly and are fixedly connected to the bases of the arms of the yoke 20, as clearly shown in Fig. 1. Said brace rods are for the purpose of maintaining the rear axle housing in true right-angled position with reference to the axis of the rod 19.

Preferably formed integrally with the upper member of the differential gear case is the worm case 23 arranged upon the top of the differential gear case and inclosing the worm shaft 24 provided with the integral worm 25 meshing with the worm wheel 7. The shaft 24 is journaled in the radial ball bearings 26 and 27 and the thrust ball bearings 28 and 29 which bearings maintain the shaft in perfectly true alinement and position with respect to the worm wheel 7. The forward end of the shaft 24 projects frontwardly through the worm case and is connected by means of the coupling 30 with the armature shaft 31 of the electric motor 32. Said electric motor is fixedly connected to the thrust and torque rod 19 by means of motor supporting flanges 33 preferably formed integrally with said thrust and torque rod and provided with an upper motor receiving face of appropriate contour to fit the case of the motor. Means such as the machine screws 34 are used to connect the motor to said flanges. As will be clearly seen from an inspection of Figs. 2 and 4 the motor when so mounted with the shaft 31 in proper true alinement with the shaft 24, is in position to drive said shaft 24 and the worm wheel 7 in the most direct, efficient and satisfactory manner. In the making of the thrust and torque rod in connection with the lower portion of the differential gear case the portions of said gear case and the motor seating face of the flanges 33 may be machined at the same time thus insuring proper alinement of the moving parts of both the motor and driving gear.

Suitable wire connections 35, shown in the figures as broken away, should of course be provided as also a source of current, such as a storage battery and the controller, but these portions being common and well known, and forming no specific portion of the present invention, it is not necessary herein to disclose or describe. It will also be understood that the forward end of the chassis should be provided with a front axle and front wheels adapted for steering, as well known in the art.

By mounting the motor upon the combined thrust and torque rod, rigidly connecting said rod to the axle housing 2, and connecting the forward end of said rod to the cross piece 8, as described, the tendency of the axle casing to rotate around the axle is readily overcome without straining any of the working parts, the motor is mounted in the most advantageous manner, and the driving thrust imparted by the housing 2 is transferred to the frame of the vehicle at the point best adapted to insure proper control of the vehicle at all times. The springs are also relieved of any thrust straining, and the motor construction is rendered exceedingly simple, strong, efficient and durable. The absence of a long jack shaft is especially called to notice and it will be seen from an inspection of the drawings that it is practically impossible for the working parts to be strained out of position with reference to each other, the construction disclosed being peculiarly adapted to work in a noiseless, smooth, and easy running manner very desirable in motor vehicles of the character described.

In Figs. 6 and 7 I have shown views of a modified construction wherein a pressed axle housing, such as is now commonly in use is employed. In such case the combined thrust and torque rod 19× is connected to the pressed differential gear case 17× by means of bolts or screws 36 or other suitable devices, the rear end of said rod being provided with a socket of appropriate shape to conform to the external contour of the case 17×. In such modified construction the worm case 23× is also preferably pressed and is connected to the case 17× by means of bolts 37. The general principles of constructions of the modified form are the same as those in the preferred form, the modifications in structure being those which are desirable in order to accommodate my invention to a form of pressed axle housing and differential gear case now commonly employed.

I claim:—

1. A motor vehicle comprising, in combination with a rear driving axle and housing therefor, a main frame and spring means connecting said frame to said housing; a single combined thrust and torque rod fixedly connected at one end to said housing intermediate the ends thereof extending in the vertical, longitudinal, median plane of the vehicle and having its other end nonlongitudinally movably connected to said main frame, a motor mounted upon said rod, operative connection between said motor and said axle, and said rod adapted to overcome the reactive torque of said housing and constituting the sole means for the transmission of the driving thrust from said housing to said main frame.

2. A motor vehicle comprising, in combination, a main frame, a rear driving axle, two tubular housing portions arranged upon said axle, a differential gear case intermediate said tubular portions and connected thereto, said differential gear case comprising an upper portion and a lower portion, a single combined thrust, torque and motor carrying extension formed integrally with said lower portion, extending forwardly and pivotally and non-longitudinally movably connected at its forward end to said frame, a worm case formed integrally with said upper portion, a worm wheel and a differential gear in said differential gear case, said worm wheel connected by said differential gear to said driving axle, a worm operatively mounted in said worm case and meshing with said worm wheel, an electric motor mounted upon said extension and direct-connecting means between the armature shaft of said motor and said worm.

3. In a motor vehicle, the combination of a main frame, a rear axle, a differential gear connected thereto and provided with a worm wheel, a worm meshing with said worm wheel, a rear axle housing provided medially with a differential and worm case portion having a single lateral extension provided with a motor seat, an electric motor mounted on said seat and having its armature shaft direct-connected to said worm and said lateral extension connected to said main frame and constituting a combined torsion and thrust rod.

4. In a motor vehicle the combination of a main frame, a rear axle, a rear axle housing provided with a median lateral extension provided with a motor seat, an electric motor mounted on said seat, operative connection connecting the armature of said motor with said rear axle and medially disposed connecting means connecting said lateral extension to said main frame, and constituting a single combined torsion and thrust rod adapted to impart the driving thrust received from said housing medially through said lateral extension to said main frame.

5. In a motor vehicle, the combination of a main frame, a rear driving axle, a differential gear connected to said axle substantially midway between its ends, said differential gear provided with a worm wheel, a worm meshing with said worm wheel, a driving axle housing provided substantially midway between its ends with a differential and worm case portion inclosing said differential gear, worm wheel and worm, said housing provided with a lateral extension extending from said case portion and provided with a motor seat, an electric motor mounted on said seat and having its armature shaft direct-connected to said worm, and means connecting said lateral extension to said main frame, said means and lateral extension constituting a single, median torsion rod and transmitting the driving thrust of said rear axle housing to said main frame.

6. In a motor vehicle, a main frame, springs, and a rear driving axle and housing therefor, said rear axle housing connected to said main frame at the two sides thereof by said springs and adapted for movement vertically and longitudinally of said vehicle, said housing provided intermediate its ends with an integral, lateral projection constituting a motor seat, an extension of said projection in the median, vertical, longitudinal plane of the vehicle connected to said main frame, a motor mounted upon said motor seat, means connecting said motor and said live axle, and said lateral projection and extension thereof constituting the driving-thrust-imparting means from said axle housing to the main frame.

In testimony that I claim the above, I have hereunto subscribed my name in the presence of two witnesses.

LEROY S. PFOUTS.

Witnesses:
  SYLVIA BORON,
  WILLIAM H. MILLER.

Copies of this patent may be obtained for five cents each, by addressing the "Commissioner of Patents, Washington, D. C."